Patented Apr. 28, 1953

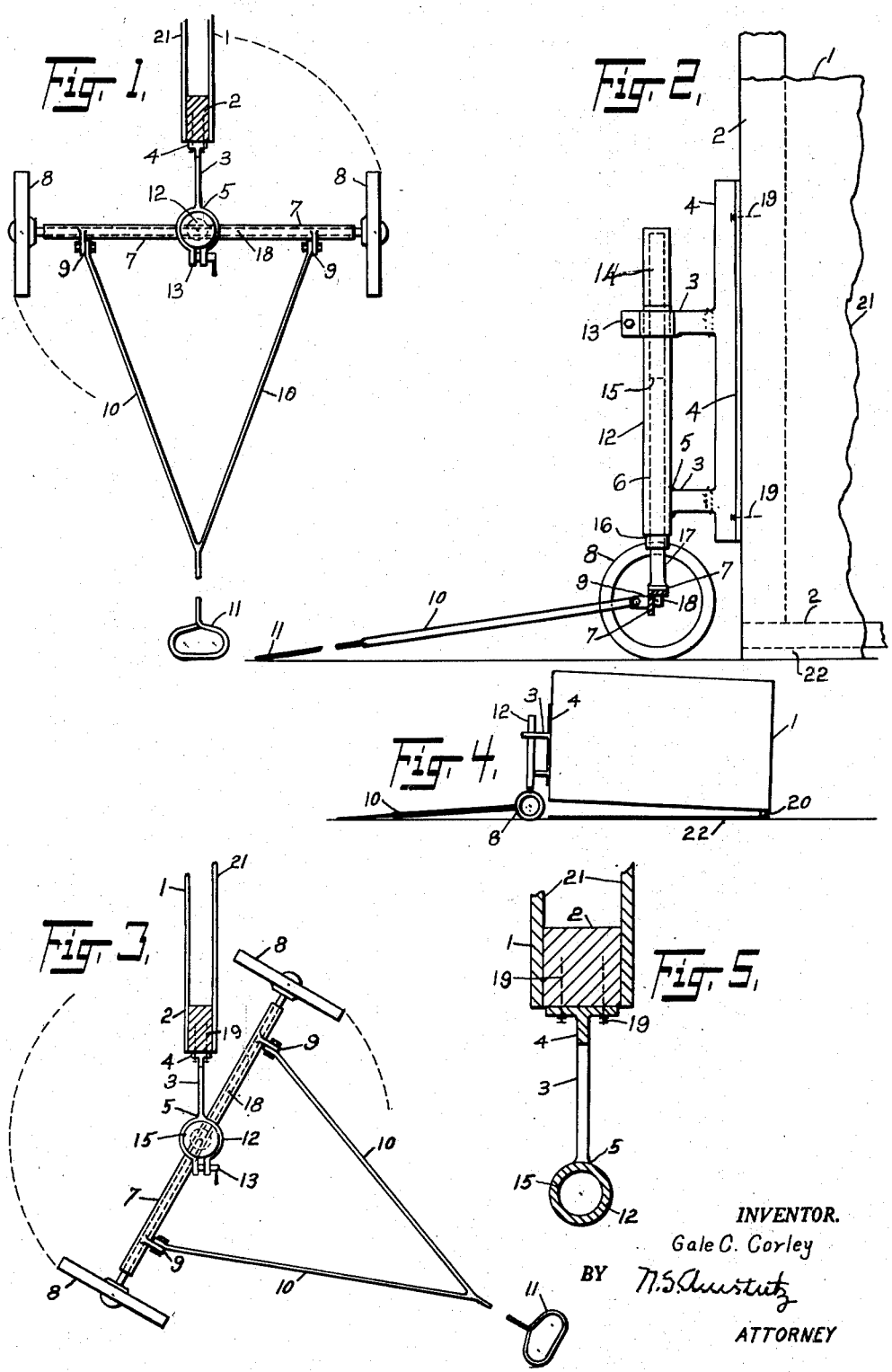

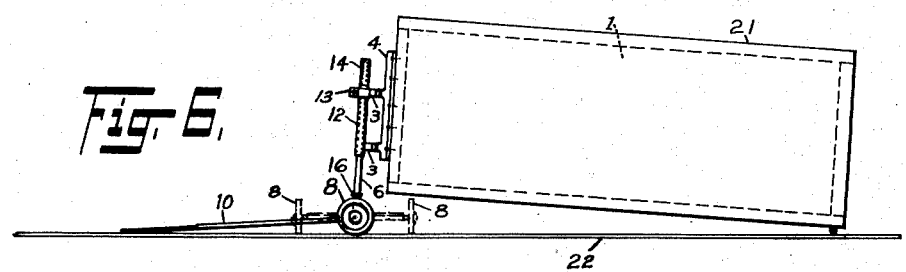
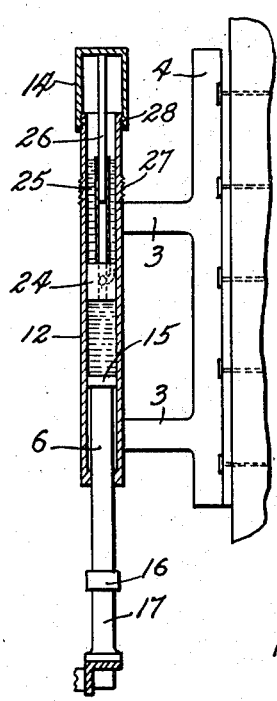
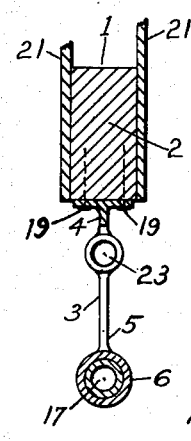
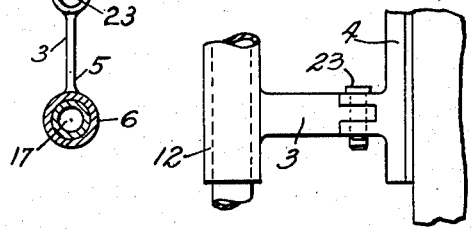
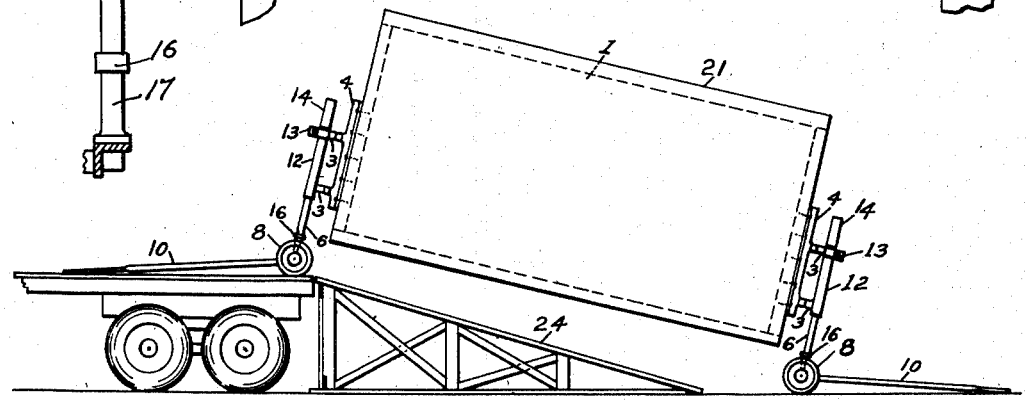

2,636,623

UNITED STATES PATENT OFFICE 2,636,623

CART FOR POSITIONING BUILDING PANELS

Gale C. Corley, Valparaiso, Ind.

Application November 30, 1949, Serial No. 130,135

8 Claims. (Cl. 214—95)

My invention relates to improvements in the positioning of building walls and more especially relates to a cart for positioning prefabricated panels used in the construction of buildings.

The purpose of my invention is to provide a mechanism for individually handling prefabricated walls and partitions; that facilitates the positioning of such sections of the outer external walls or the inside partion walls as prefabricated units; that facilitates the handling of such prefabricated units from a delivery truck to the required position of each separate unit; that may use a two wheel cart provided with a hydraulic, pneumatic or mechanical lifting device attached pivotally to the edge of a prefabricated panel; that is adaptable to position one end of a prefabricated panel, or both ends of a panel with duplicate carts.

With these and other related ends in view, I illustrate in the accompanying drawings such a mechanism and the applications thereof which will show the broad underlying features of the invention. However, the invention is not to be limited to the specific details shown on the drawings and described herein.

Fig. 1 is a top plan view of a two-wheeled cart secured to the edge of a prefabricated panel;

Fig. 2 is an elevational view of the cart of Fig. 1;

Fig. 3 is a top plan view showing the pivotal relation between the cart and the end of a panel connected thereto;

Fig. 4 is a reduced scale diagrammatic elevation of a raised panel;

Fig. 5 is an enlarged cross section of the panel attaching member;

Fig. 6 is an enlarged elevation of Fig. 4;

Figs. 7 and 7a illustrate a modified pivot structure for connection to the edge of a panel;

Fig. 8 is an elevation of a panel being removed from a truck, over an inclined platform; and Fig. 9 illustrates the details of a jack structure which may be used.

In the use of my invention, I may modify the details of construction and the use of different lifting means according to the exigencies of varying conditions without departing from the broad spirit of the invention.

Referring to Figs. 1–3 of the drawing, the two-wheeled cart comprises an axle structure including member 7 of angular cross section beneath which there is a shaft 18 secured to the ends of the angle member 7. The shaft 18 extends outward from each end of the angle member 7 to form a support for a rubber-tire wheel 8 which rotates thereon. On the angular member 7, at about midway of its length, there is secured an upwardly extending projection 17 having a collar 16. A stationary piston 15 is supported by arm 6 above the collar 16 and enclosed by an external tube 12 cooperating with a short tube 14, part of a conventional lifting jack.

The jack structure, shown more in detail in Fig. 9, may be what is ordinarily known as an automobile hydraulic bumper lifting jack; or, the equivalent of simple mechanical lifting means. These different parts in and of themselves and their specific details of construction do not form a direct part of my invention, which is confined to a wide tread wheel-cart provided with means for raising and lowering one vertical edge 2 of a prefabricated panel, and which is rigidly attached to the unit in a temporary manner by nails 19, or other means. At the same time, the axial position of the cart is in a vertical pivotal relation to the panel so that the cart may approach the final position of the ends of the panel from different angles (Fig. 3). Thus, the lifting function is combined with a pivotal support 17 between the panel attachment and the axial position of the cart wheels.

The outer tube 12 of whatever form is used has upper and lower side projections 3 attached to a vertical supporting member 4 that is temporarily nailed at 19 to the upstanding edge 2 of a prefabricated panel. The projections may include portions surrounding the tube 12 and clamped as shown at 13, or may be secured thereto in other ways as by welding indicated at 5.

A prefabricated panel 1 comprises 2 x 4 members (or any other dimension), 2 along the top, bottom, and end edges, with 2 x 4 studding between the top and bottom members conventionally spaced apart. Along both edges of the 2 x 4 members conventional wallboards or plywood 21 are attached. These panels 1 may be finally positioned on top of a prenailed floor strip 22 that will hold the panel attached to the floor in its final position. There may be a roller or skid plate 20 beneath one end of the floorpiece 22.

As stated above, in the final operation of my structural assembly cart, I may use any adaptations of either a hydraulic, pneumatic, or mechanically operated jack to raise the end portions of a panel to the required height for positioning it in its final assembled relation to form a part of a completed wall (Fig. 4).

In its simplicity, the cart is supplied with an axle 18, two wheels 8, and a shifting handle 11 with guiding connections 10 pivoted at 9 so arranged that the piston 15 forms a vertical pivot parallel to the edge 2 of a panel 1, and it may take different angular horizontal positions in respect of the panel edge (Fig. 3), so as to position the panel at its supported edge in its final structural relation to the floor member 22; the other partitions being used for partitions or external walls.

As a modification of the structure, the vertical member 4, that is temporarily nailed to the end of a panel 1 at 19, may be connected through vertical pivots in the supports 3 that project sidewise from the jack members. This permits a slight angular change in position without swinging the cart wheels 8. Or, dependence may be placed entirely on the vertical pivotal relation between the vertical center of the jack and the edge of the panel.

As stated above, the cooperating parts of one or another form of lifting jack may be varied as desired. The entire purpose of the mechanism being such that the end weight of a panel is raised a sufficient height above the permanent floorboard, and at the same time, is positioned vertically above the floorboard for final attachment to it.

There are innumeral different forms of jacks that may be used, some more efficiently than others, but in the main, serving simply to hold the weight of one end of a panel raised above its final resting place, and a release of the jack support to drop the panel into its permanent position. One form of hydraulic jack is shown in Fig. 9. A valve structure 24 is provided in the tube 12 and the hydraulic fluid is pumped between the valve structure and piston 15 to raise the tube 14. This action is accomplished by moving the tube 14 having a plunger 26 attached thereto which operates in a tube 25 connected to the valve structure. Threads 27 may be provided on the tube 12 for engaging with threads 28 on the tube 14 to hold the tube 14 in fixed position.

It is, of course, obvious that a duplicate cart can be used, when desired, at each end of a prefabricated panel. The structure of the cart as to the distance that the two wheels are spaced apart from each other bears a relation to the normal height of a prefabricated panel. This distance is to be sufficient in relation to the height of a panel in order to secure stability in varying wind velocities to prevent a panel tending to topple over sideways.

Fig. 8 shows the transfer of a prefabricated panel from a truck to the floor of the house that is under construction. This often requires that the panel be supported by a cart at each end. In such an event the incline 24 may not be entirely smooth, but the panel is supported on the cart standard 17, high enough to pass over small projections without engagement with the lower edge of the panel.

There is a basic cooperation between a slightly raised panel and a vertical pivot between the panel attachment and the center of the cart so that the cart can swing into different horizontal angles within 360 degrees, when the panel has been taken from a delivery truck to its final resting place at a predetermined position on the floor of the room. Fig. 6 shows the panel raised sufficiently high to permit the wheels 8 to pass entirely through under the panel, if desired.

Before a panel is in its final position above a floor board the cart can be swung around through 360 degrees as shown by the circle on Fig. 3 so as to position the end 2 of the panel 1 in the desired position to engage with the edge of another panel. In case the floor board is in position, then the cart wheels 8 may be brought around until they touch the floor board edges, almost completing 360 degrees. In the absence of a floor board an entire 360 degrees may be completed.

Sometimes it is desirable for the center of the standard 17 to be close to the edge of the panel. A shorter radius of action may be provided by moving the center of 17 nearer to the vertical edge 2 of the panel. For example, the center of 17 may be shifted to coincide with the center of the hinge 23 of Figs. 7 and 7a.

Other modifications may be made within the intended scope of the invention as defined by the appended claims.

What I claim is:

1. A cart for positioning a building panel including in combination, an elongated horizontal axle, a pair of wheels secured to the ends of said axle for supporting the same, a control handle secured to said axle, vertical supporting means secured to said axle intermediate the ends thereof including a jack structure having a pair of members interconnected to provide pivotal movement therebetween, one of said members being secured to said axle, and a vertical support portion secured to the other of said members and adapted to be connected to an edge of a panel to be positioned, said jack structure including means for changing the vertical position of said other member with respect to said one member for raising said panel.

2. A cart for positioning a building panel including in combination, an elongated horizontal axle, a pair of wheels secured to the ends of said axle for supporting the same, a control handle secured to said axle, vertical supporting means including a first portion secured to said axle and a second portion adapted to be connected to an edge of a panel to be positioned, said supporting means including means providing a pivotal connection between said first and second portions and a jack structure including means for changing the vertical position of said second portion with respect to said first portion, with the vertical position being independent of the pivotal relation between said portions.

3. A cart for positioning a building panel including in combination, an elongated axle, a pair of wheels secured to the ends of said axle for supporting the same, a control handle secured to said axle, a first support portion secured to said axle at substantially a right angle thereto, a second supporting portion adapted to be connected to an edge of a panel to be positioned, said second supporting portion being pivotally supported on said first supporting portion, and jack means for changing the postiion of said second portion with respect to said first portion for elevating a panel connected thereto.

4. A cart for positioning an object supported thereby including in combination, an elongated horizontal axle, a pair of wheels secured to the ends of said axle for supporting the same, a control handle secured to said axle, vertical supporting means including a jack structure having a first portion secured to said axle intermediate the ends thereof and a second portion adapted to be connected to the object to be positioned, said first and second portions being interconnected to provide pivotal movement therebetween, said jack structure including elevating means for changing the vertical position of said second portion with respect to said first portion, with said vertical position of said second portion being independent of the pivotal position between said portions.

5. A cart for positioning a building panel including in combination, an elongated horizontal axle, a pair of wheels secured to the ends of said axle for supporting the same, a control handle secured to said axle, and vertical supporting means including a jack structure having a first member secured to said axle and including a cylindrical portion and a second member adapted to be connected to an edge of a panel to be positioned and including a tubular portion about said cylindrical portion and sliding thereon to provide pivotal movement therebetween, said jack structure including means for lifting said tubular portion with respect to said cylindrical portion.

6. A cart for positioning an object supported thereby including in combination, an elongated horizontal axle, a pair of wheels secured to the ends of said axle for supporting the same, a control handle secured to said axle, vertical supporting means including a jack structure having a cylindrical portion secured to said axle intermediate the ends thereof and a tubular portion about said cylindrical portion and sliding thereon to provide pivotal movement therebetween, said jack structure including means for lifting said tubular portion with respect to said cylindrical portion, and a vertically extending member secured to said tubular portion adapted to be connected to the object to be positioned.

7. A cart for positioning a building panel including in combination, an elongated horizontal axle, a pair of wheels secured to the ends of said axle for supporting the same, a control handle secured to said axle, vertical supporting means including a jack structure having a cylindrical portion secured to said axle intermediate the ends thereof and a tubular portion about said cylindrical portion and sliding thereon to provide pivotal movement therebetween, said jack structure including hydraulic means for lifting said tubular portion with respect to said cylindrical portion, and a vertically extending member adapted to be connected to an edge of a panel pivotally connected to said tubular portion.

8. A cart for positioning a building panel including in combination, an elongated horizontal axle, a pair of wheels secured to the ends of said axle for supporting the same, a control handle secured to said axle, vertical supporting means secured to said axle intermediate the ends thereof including a jack structure having a first member secured to said axle, a second member slidable vertically along said first member, and means for changing the vertical position of said second member with respect to said first member, and a vertical support portion pivotally secured to said second member and adapted to be connected to an edge of a panel to be positioned.

GALE C. CORLEY.

References Cited in the file of this patent

UNITED STATES PATENTS

| Number | Name | Date |
| --- | --- | --- |
| 897,853 | Vom Scheidt | Sept. 1, 1908 |
| 1,902,834 | Cohen-Venezian | Mar. 28, 1933 |
| 1,964,119 | Hendry | June 26, 1934 |
| 2,204,830 | Bell | June 18, 1940 |
| 2,271,624 | Cochran | Feb. 3, 1942 |
| 2,415,655 | Reinert | Feb. 11, 1947 |
| 2,465,206 | Davis | Mar. 22, 1949 |
| 2,481,005 | Danhaus | Sept. 6, 1949 |